United States Patent
Bauer et al.

(10) Patent No.: US 7,124,179 B1
(45) Date of Patent: *Oct. 17, 2006

(54) SINGLE MANAGEMENT POINT FOR A STORAGE SYSTEM OR STORAGE AREA NETWORK

(75) Inventors: Andreas L. Bauer, Maynard, MA (US); Russell R. Laporte, Webster, MA (US); Richard J. Nordin, Worcester, MA (US); Brian G. Campbell, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/964,090

(22) Filed: Oct. 13, 2004

Related U.S. Application Data

(63) Continuation of application No. 09/798,571, filed on Mar. 3, 2001, now Pat. No. 6,839,750.

(51) Int. Cl.
*G06F 15/40* (2006.01)
(52) U.S. Cl. .................. 709/223; 707/103 R; 707/103; 709/218; 709/252
(58) Field of Classification Search ...................... None
See application file for complete search history.

(56) References Cited

U.S. PATENT DOCUMENTS 6,542,899 B1 * 4/2003 Saulpaugh et al. ..... 707/103 R
6,671,853 B1 * 12/2003 Burkett et al. ............... 715/513
2004/0059759 A1 * 3/2004 Doan et al. .................. 707/205

FOREIGN PATENT DOCUMENTS

EP          1030248 A1 *   8/2000

* cited by examiner

*Primary Examiner*—B. James Peikari
(74) *Attorney, Agent, or Firm*—Krishnendu Gupta; Joel Wall; Robert Kevin Perkins

(57) ABSTRACT

There is disclosed a system, method, apparatus and computer program product for managing a storage system including a SAN within a computer network. The storage system can be managed in object-oriented computer language. Object trees of each component in the storage system or SAN are obtained and combined on each storage processor in the storage system. The user interface (UI) can therefore select one storage processor within the storage system, and request such combined object tree information for the entire storage system or SAN from only that singular storage processor on which such combined information is stored. This eliminates a severe computational drain on the UI, which otherwise would be required to make these object tree combinations, and further allows a single point of storage management contact between UI and storage system or SAN by way of that singular storage or portal processor. Commands from the UI destined for any node within the storage system or SAN are thus always addressed to that same single point of contact or portal processor allowing for ease of use and other advantages.

14 Claims, 6 Drawing Sheets

SINGLE MANAGEMENT POINT FOR A STORAGE SYSTEM OR STORAGE AREA NETWORK

CROSS REFERENCE TO RELATED APPLICATIONS

This patent application is a continuation application, filed under 37 C.F.R. § 1.53(b)(1), of prior non-provisional parent application Ser. No. 09/798,571, filed Mar. 3, 2001, entitled "Single-Management Point for a Storage System or Storage Area Network" and which issued as U.S. Pat. No. 6,839,750 on Jan. 4, 2005. This patent application has the same inventorship as that of the parent application, and has its assignee in common with that of the parent application. Benefits under Title 35 United States Code section 120 (35 U.S.C. § 120) are hereby claimed.

FIELD OF THE INVENTION

The present invention generally relates to computer networks and, more particularly, relates to managing storage systems including storage area networks (SANs) within such computer networks.

BACKGROUND OF THE INVENTION

Virtually all human activity in our modern society is now impacted to at least some degree by computer networks, although we are probably not always aware of that impact. One prime example is the Internet network, which has made its influence felt in ways not imagined just a few years ago. The vast amount of information made available thereby, and the ease of communication provided thereby between far-flung communities remains astonishing. Of course, there are smaller networks, some of which are sometimes referred to as LANs (Local Area Networks) which can be used within corporate organizations, certain government organizations or other limited areas which likewise provide techniques for enhancing human productivity.

Certain kinds of networks can employ a client workstation or user interface interacting with or controlling other sections of the network such as storage system sections. Because of today's widespread demand for computer networks, they may frequently be worked to their limits in whatever applications they are employed. In storage area networks (SANs) which encompass storage systems often comprised of multiple manageable components, connected servers (computers) and other network nodes including interconnects such as switches and hubs, it is a large task to manage all such nodes. This task may be handled through application of what is generically termed "management software". This software normally runs on the client or user interface (UI) computer while, at the same time, also being deployed and running as agent software on various network nodes such as servers connected between the client computer and the storage systems, or, more recently, as agent software on storage processors (yet other computers) within such storage systems.

Accordingly, current management software is employed in certain client-server network architectures to manage disk arrays by communicating with its agent software that runs on the array's storage processors and on attached hosts (servers). But, to fully manage such an array, the user has to connect to and communicate with all storage-23 related nodes including storage processors and any attached hosts. This means that there are a vast number of individual connections and communications between the client (user interface) and various network nodes. This configuration imposes a heavy burden on the client computer in dealing with all of the nodes in its network.

As a simplified example of multiple UI-to-storage-system connections and communications in the prior art, refer to prior art FIG. 1, where a network is shown comprising user interface (client workstation) 100 and storage system 103. UI 100 is connected by two bus connections 101 and 102 to two storage processors 104 and 105 respectively. Those processors and disk drives 106 and 107 connected therefrom by network paths 108 and 109 respectively all are contained within storage system 103. (Cross coupling 111 and 110 between storage processor 104 and disk drive 107, and storage processor 105 and disk drive 106 respectively, are shown as dashed lines to suggest secondary or back-up connectivity.) As noted above, it would not be atypical for servers to be included in such configuration and located between the UI and each storage processor directly in the path of bus connections 101 and 102, but are not shown herein to enhance clarity of presentation.

As another example of multiple UI connection and communication shortcomings of certain prior art configurations, refer to prior art FIG. 2. The same network as that of FIG. 1 is shown, but, in addition, with a number of servers 213, 214, and 215 attached to the storage system via bus 212 (typically a Small Computer System Interface or SCSI bus), in a Storage Area Network (SAN) configuration and not attached in the server capacity or configuration mentioned in the prior paragraph. It can be seen that this configuration entails three more connections, 216, 217, and 218 between these SAN servers and user interface 100, with their respective communications. Boundary 219 circumscribes all storage-related nodes shown in this Figure, and is therefore a boundary for the SAN which could contain yet additional nodes. It should be understood that only three servers are shown herein for purposes of simplification, but, in reality, there can be up to fifteen or more such servers per SAN, each having its own connection and communication to the UI. And, there can be many SANs, perhaps 100 or more per UI, in a local area network (LAN) as a function of need. For this example, this translates to some 1700 separate and concurrent communication links to the UI!

Obviously, the point of these examples is to clearly show that the number of nodes per network requiring UI direct handling over dedicated lines can multiply significantly. The UI computer resource can be overburdened in managing each node in the SAN via a dedicated line to each such node. Furthermore, even before such managing can take place, this multi-connection arrangement requires the user to initially determine what hosts or servers are attached to the storage system and what their names or Internet addresses are, in order to properly deal with them. Thus, even if managing only a single storage system (even if employing only one array), the human user has to provide the client application software with the Internet addresses of all storage processors and all attached hosts which requires manual adjustments when new hosts are added or removed or when any addresses change. This increases the likelihood of imposing human error on the system. Additionally, since the client application software is required to communicate with multiple storage processors and all attached hosts, management performance is slow and only a limited number of nodes can be managed.

In the foregoing prior art examples, object-oriented programming languages such as "C++" have been employed. An object, in computer software terms, is a dedicated area of memory which can be thought of as an impervious "container" holding both data and instructions within itself, both defining itself and its relationships to other objects in the system or network. An object sends and receives messages to and from other objects, responds and reacts to such messages (e.g. commands) but is normally impervious to internal scrutiny. For example, a storage processor (which is a kind of computer) can be characterized as a "family" or "tree" of objects, where each such object may describe or relate to a specific detail in the processor (e.g. a fan, power switch, cache memory, power supply, disk drive interface, etc.), where these objects in the storage processor can send messages to each other and to other objects outside the processor. In prior art object-oriented computer networks, these objects defining various storage processors, servers and other nodes in the storage system, and relationships between them, were transferred back to the client application software running on the user interface computer where those objects were reassembled in the UI computer into a complete object tree reflecting the entire configuration of the storage system. This imposed a large burden on the user interface computer's processing power, which prevented it from performing other required tasks more efficiently, and from being optimized as a processing resource. In addition, to the overburdening shortcoming, users are sometimes confused by the complexity of having multiple operative connections into a single storage system or SAN.

These various shortcomings and problems of the prior art are overcome through the welcome arrival of applicants' present invention. Not only is the overburdening problem alleviated, but the overall configuration is simpler and more readily understood by users of the system.

SUMMARY OF THE INVENTION

Embodiments of the present invention relate to system, apparatus, method, and computer program product for managing a storage system or Storage Area Network (SAN) within a computer network through a single point of contact on the storage system or SAN. The present invention thus relates to any such computer network including a user interface (UI) or client workstation where such storage system has a number of storage processors and one or more disk drives. The managing of such storage system involves a number of activities including selectively communicating between the user interface and each one of the storage processors. Further, each one of the storage processors learns and stores information about itself and about all other nodes in the network including all other storage processors. It further learns and stores information about its relationship with all of these other nodes and about the inter-relationships between any one of these other nodes and any other of them, to thereby obtain and have available complete network node information on each storage processor. The user interface requests the complete network node information from a particular one of these storage processors (portal processor) and thereby establishes a single management point of contact or point of ingress/egress or port through which to manage the storage network or SAN.

In a further feature of the present invention, the user interface sends commands destined for all nodes in the storage system or SAN to such particular storage processor which responds to certain of those commands destined for itself and which sends all other commands to other nodes in the storage system or SAN to which such other commands were destined.

In another aspect of the present invention, software language used in the computer network is an object oriented language whereby information learned and stored by the storage processors about themselves and the other nodes in the storage system or SAN is object tree information. In this object oriented environment, all storage processors, servers and any other attached nodes in the storage system or SAN construct their own respective object trees including information about themselves and their directly connected (child) nodes. In a significant advance in design, at least as applied in this context, each storage processor automatically and without user intervention, both determines IP addresses for all other storage processors and then requests their respective constructed object trees. Each storage processor combines its own object tree information with all object trees received from all other storage processors into its combined storage processor object tree view. Again, in a significant advance in design, at least as applied in this context, each storage processor looks up IP addresses for all attached servers (if any) and all attached other nodes (if any) in the storage system or SAN automatically and without user intervention. Each storage processor requests all such attached servers and all other nodes to forward their respective object trees and combines all such received object trees with its combined storage processor object tree view to obtain a combined storage system object tree view or combined SAN object tree view. The user interface selects a particular storage processor to act as the storage system or SAN portal processor. The portal processor forwards the combined storage system object tree view or combined SAN object tree view to the user interface to enable the user interface to manage the storage system or SAN.

It is thus a general object of the present invention to provide an improved computer network.

It is another object of the present invention to provide an improved computer network wherein the user interface or client workstation computer is utilized more efficiently.

It is yet another object of the present invention to provide an improved computer network wherein the workload for the user interface or client workstation computer is significantly reduced by shifting responsibility for performing a major portion of its work to a multitude of computer nodes in the managed network.

It is a still further object of the present invention to provide an improved computer network where only one communication link between a user interface and a storage system or SAN is needed to manage the entire storage system or SAN.

It is thus advantageous to employ embodiments of the present invention in networks involving user interface computers and storage systems or SANs. For one example, it is more intuitive and easier for a human user to be able to point at only one SAN processor and retrieve the entire SAN information. Furthermore, it is beneficial to improve scalability of the user interface by freeing it up from the burden of dealing concurrently with a huge number of SAN nodes, and instead putting its processing power to work on other more significant activities. For example, in a huge network comprising many SANs, such freed-up processing power allows the computer to ultimately manage several thousand or even tens-of-thousands of nodes via a single communication link to each SAN in that huge network.

Another advantage of employing certain software embodiments of the present invention relates directly to Internet usage. Such software can be written so that a user can run it within a web browser. Since there is space for only one value in the web browser field (i.e. http://

WWW._____), only one value can be inserted which can be the singular IP address of the portal processor of the present invention. Accordingly, this allows access for purposes of control, management, or other function to an entire SAN by way of a singular Internet address which is very advantageous.

Other objects and advantages will be understood after referring to the detailed description of preferred embodiments and to the appended drawings wherein:

DESCRIPTION OF THE PREFERRED EMBODIMENTS

Introduction—Object-Oriented Programming and Definitions

Figure 1:
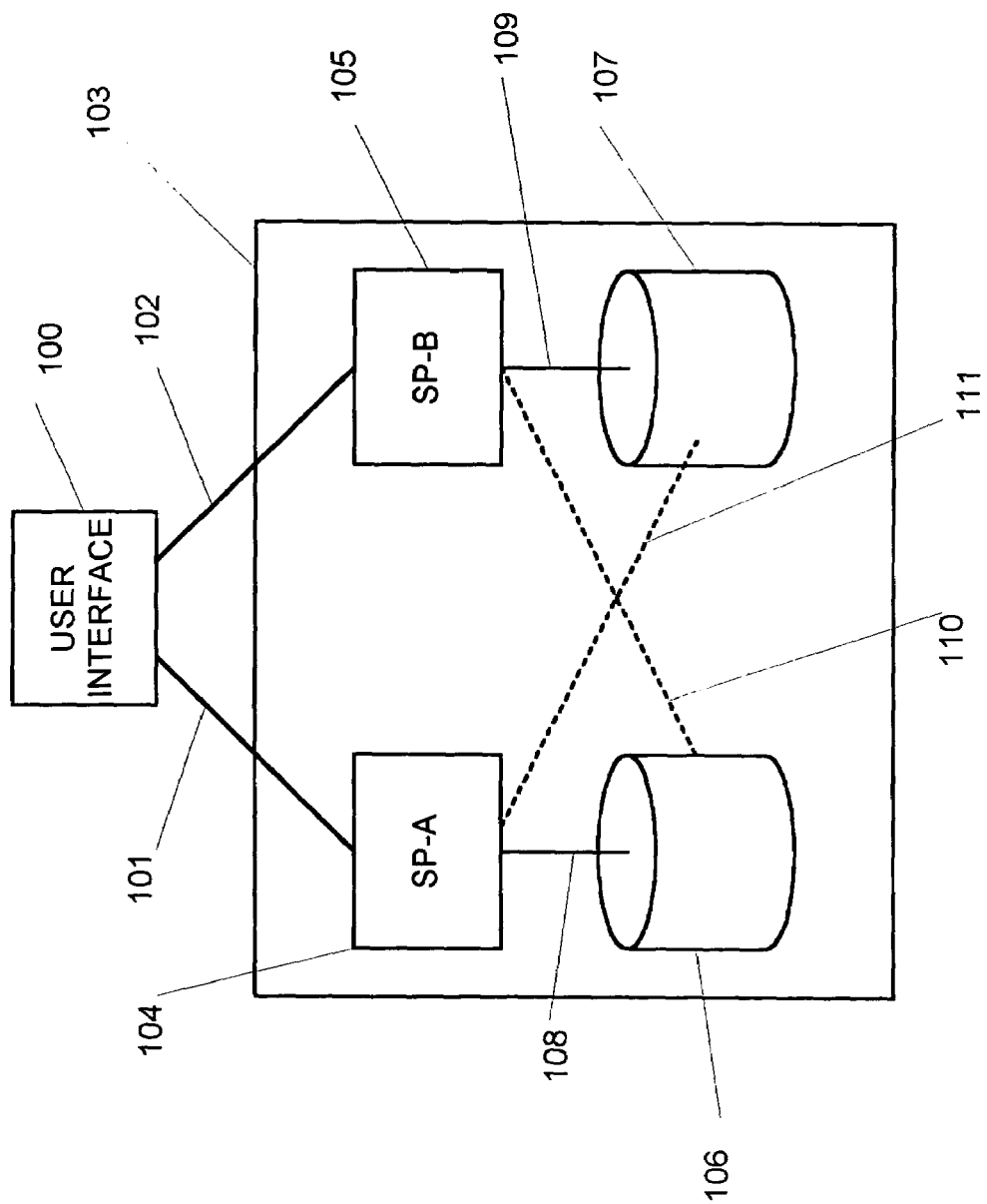
FIG. 1 is a prior art block diagram of a computer network showing a user interface and storage processors in a configuration not associated with a SAN.
Figure 2:
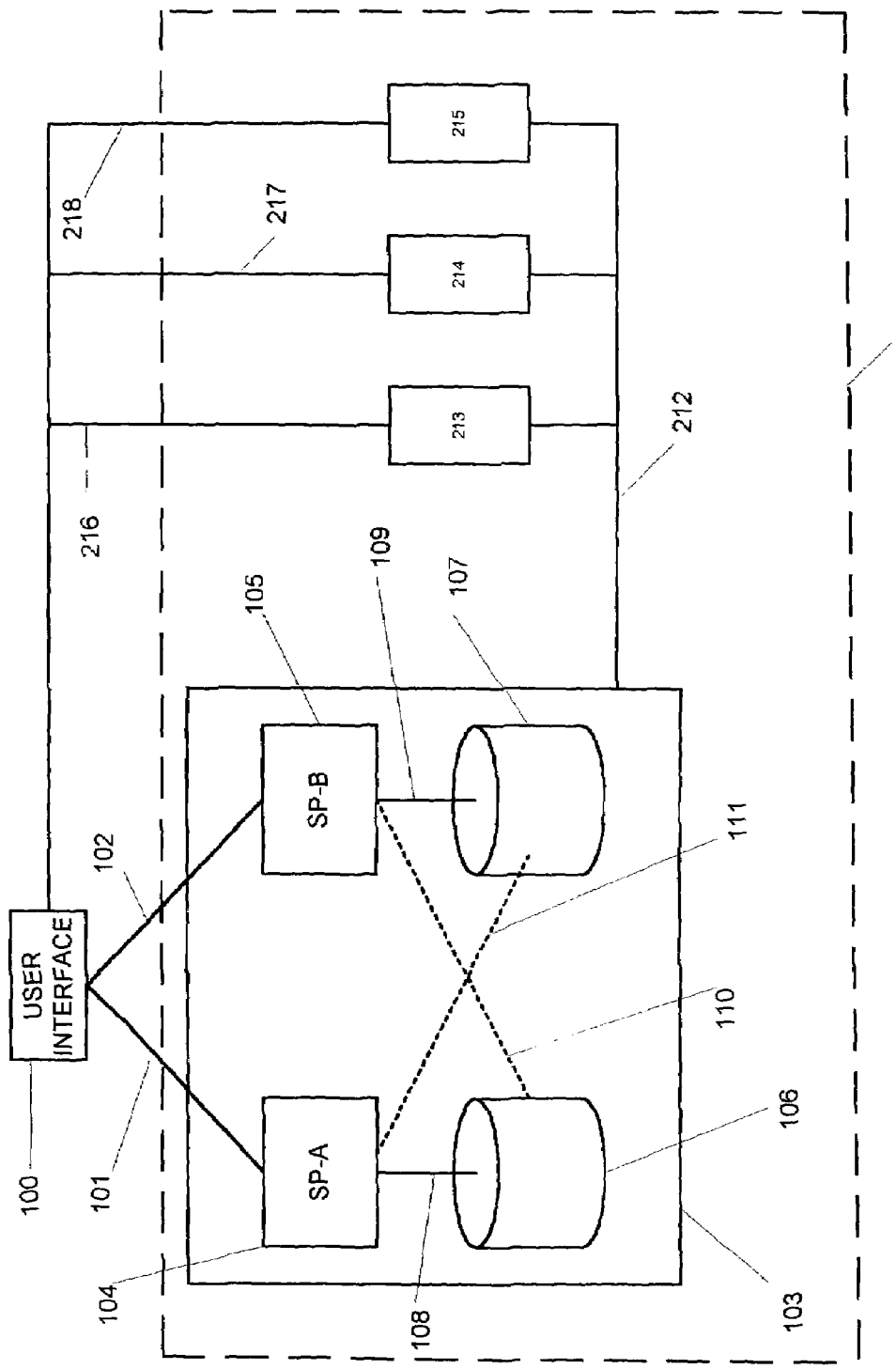
FIG. 2 is a prior art block diagram of a computer network showing a user interface and storage processors along with attached servers in a SAN configuration.

As mentioned in the background section, objects are software containers located in memory having special properties. Objects contain both data and instructions/functions and can send and receive messages between and amongst themselves, but they cannot be broken-into (i.e., they encapsulate the data contained in them and allow access only through a well-defined interface). Programmers can create relationships between objects, e.g., objects can inherit characteristics from other objects and/or they can contain such other objects and/or they can contain links to such other objects. Objects are defined by way of its class, and objects are thus instances of that class. For example, one can create an object called "Fluffy" from a class called "Feline". Multiple objects of this class can be made, each having a different name. Object "trees" are pictorial representations of relationships between objects or nodes and, in the case of a network's nodes being represented by objects, can readily convey such network's entire functional relationship. Although the present invention is not necessarily constrained to embodiments generated by object-oriented design, object trees are used in constructing a preferred embodiment of the present invention described hereinbelow.

A user interface (UI) is a computer with terminal, mouse and keyboard sometimes referred to as a client, head-end station, head station or client workstation. It can also be thought of as that connective boundary between the human-user and the computer system, such boundary typically being conceived as the client terminal's screen with keyboard and/or mouse interaction. The UI runs various kinds of software including what is termed storage management software or client software. A server, server location, host, agent, or remote agent are all synonymous terms meaning another computer which "serves" its client by functioning closely with its assigned network component or sub system such as a storage system or portion thereof. Thus, the server responds to commands from its client and serves its client in response to those commands. A client can communicate with its server directly in certain configurations. Storage management software which runs on the client has software components, which can run on various network nodes including its storage processors and server(s), and which are called agents or agent software. This software can be object-oriented software such as C++, JAVA, Smalltalk, etc. The storage system includes media for storing binary to information and typically includes disk drives in an array configuration sometimes called RAID (Redundant Array of Independent Disks). The storage system may require its own computer processing power (independent of other computer power in or associated with the network) called storage processor(s) which, among other things, can control disk drives and information flow thereto. These storage processors also can run agents or agent software. Any of these computers or processors are also commonly referred to as hosts. Peripheral cluster is storage and any other peripheral devices under control of their respective server or storage processor.

Figure 3:
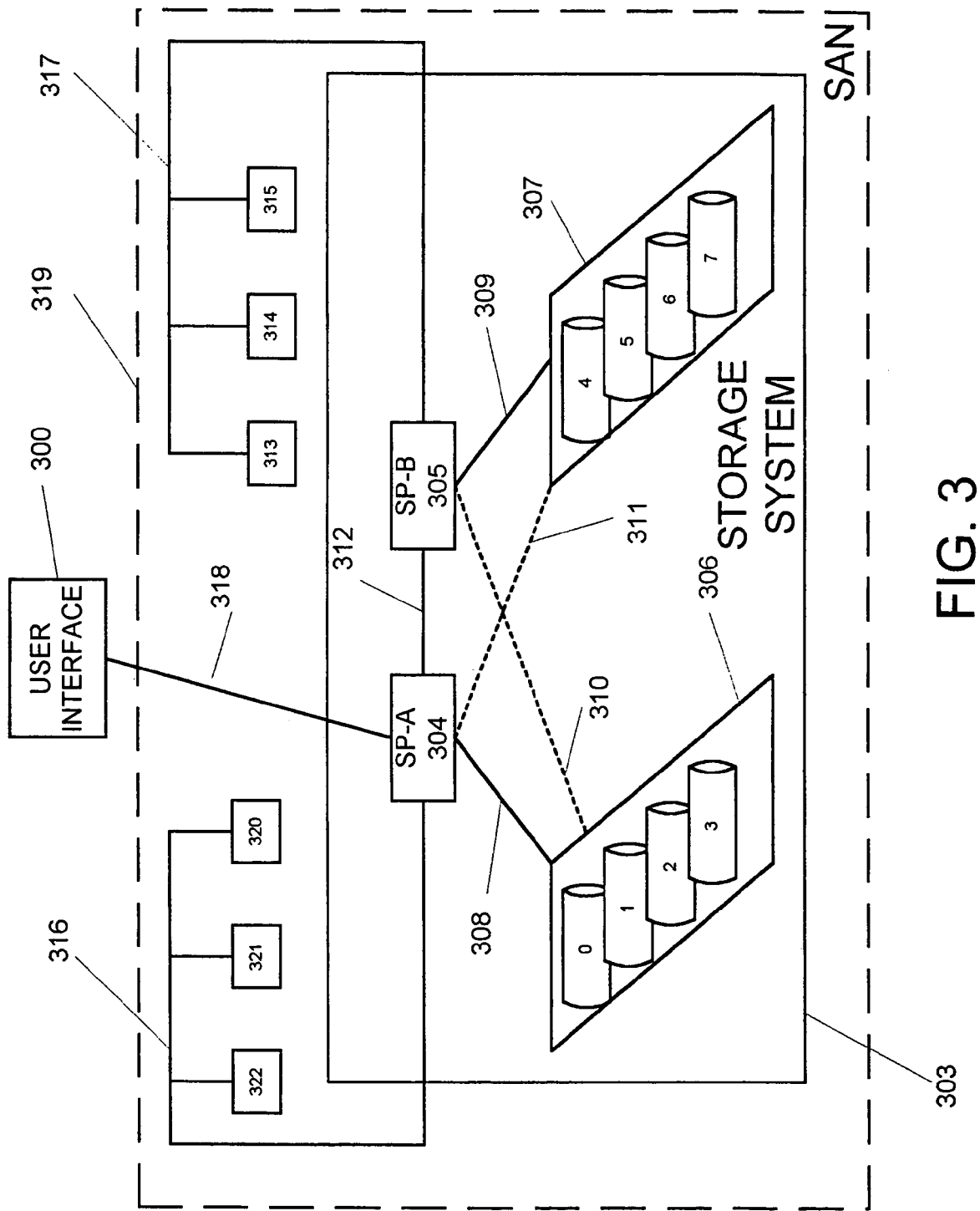
FIG. 3 is a block diagram of a computer network organized in accordance with principles of the present invention, showing a user interface and storage processors along with attached servers in a SAN configuration.

FIG. 3—San Configuration

Referring to FIG. 3, there is shown a block diagram of a computer network organized in accordance with principles of the present invention, and showing a user interface and storage processors (SPs) along with attached servers in a SAN configuration. UI 300 is communicatively connected via bus or link 318, such as a LAN bus, to SAN 319 and specifically to storage processor 304 in this example. There are other physical links from UI 300 to other SPs such as to SP 305, (and to any others—not shown) in the SAN but only one such link is used communicatively at any given time regardless of the total number of such physical bus links in existence, and more explanation about this is given hereinbelow. Only one such link is thus shown in this Fig. for purposes of enhancing clarity of explanation. SP 304 and SP 305 are inter-connected by bus 312, and are also operatively coupled to disk drives 306 and 307 respectively, through busses 308 and 309 respectively. In addition these SPs are cross coupled to each other's disk drives in a backup capacity by busses 310 and 311 shown as dashed lines. Disk drive 306 contains disks 0, 1, 2, 3 and disk drive 307 contains disks 4,5,6,7. All of these components circumscribed by boundary 303 comprise a storage system and they can be either physically close together or located remotely from each other while still representing the same storage system.

SP 304 is connected via its local bus 316 to servers 320, 321, and 322. Symmetrically, SP 305 is connected via its local bus 317 to servers 313, 314, and 315. All of these components, including the components within storage system boundary 303 and excluding UI 300, are contained within SAN 319.

In operation, utilizing an object-oriented computer language such as C++, SP 304 initially constructs an object tree of itself, showing actual relationships between the various components comprising itself as being relationships of corresponding objects or nodes in such tree (more detailed discussion of object trees, per se, will be undertaken in connection with FIG. 5 hereinbelow). Thereafter, SP 304 automatically and without user intervention requests or otherwise determines the Internet address(es) of all peer processors, which, in this example, is the address of SP 305. Such address information is forwarded from SP 305 to SP 304 over bus 312 which can be a LAN bus, ethernet bus, SCSI bus, or combination thereof, and all being compatible with the Internet. A SCSI bus may be preferred in those instances where a SCSI bus is also used internal to the disk array, allowing for better internal communication. Then, SP 304 requests and receives over bus 312 object tree information from SP 305 which had earlier constructed such object tree information of itself in a manner similar, if not identical, to how SP 304 constructed its own object tree. If a SCSI bus proves to be more work than that imposed by a LAN bus, the latter can be used in this instance. SP 304 combines its own object tree information with that of SP 305 to provide a combined storage processor object tree view.

SP 304 and SP 305 request over various interconnecting buses shown, or otherwise determine, IP addresses for all attached servers 313, 314, 315, 320, 321 and 322, and for all attached other nodes in the storage system such as disk drives 306 and 307. Then, by way of those addresses, SP 304 and SP 305 each request from the other all object tree information about the other's attached servers and disk drives; all of that obtained non-processor object tree information is returned to each such requesting storage processor. Each storage processor, SP 304 and SP 305 in this example, then combines its own previously-constructed object tree information which was rolled-up into the combined storage processor object tree view with all non-processor object tree information it receives thereby forming its own combined SAN object tree view. By way of a suitable command over bus 318 (rather than over the other similar, if not identical, bus—not shown—to SP 305), UI 300 selects SP 304 to be its "portal processor". This is the particular storage processor in the storage system selected to serve as a port for information flow from and to UI 300. UI 300 further requests its combined SAN object tree view over bus 318. SP 304 forwards such view via bus 318 to UI 300 which stores all such object tree information in its local database for purposes of allowing its users to access and view such object tree information as part of user storage system and SAN management activity.

Figure 4:
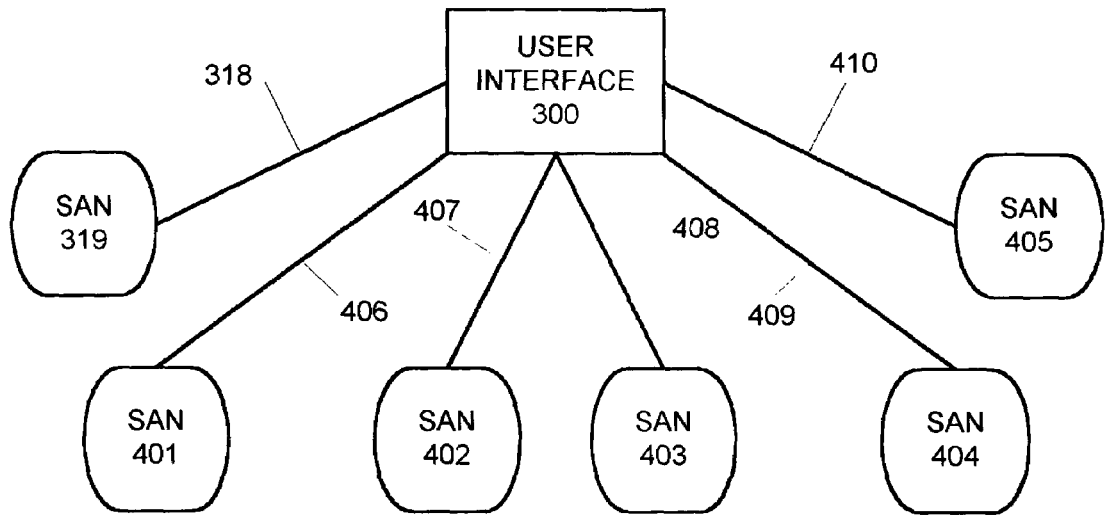
FIG. 4 is a schematic diagram of a computer network showing a user interface and multiple SAN configurations being managed by such single user interface in accordance with principles of the present invention.

FIG. 4—Multiple San Configuration

Referring next to FIG. 4, there is presented a schematic diagram of a computer network showing a user interface and multiple SAN configurations being managed by such single user interface in accordance with principles of the present invention. UI 300 is the same UI as in FIG. 3. SAN 319 of FIG. 3 is shown in FIG. 4 and is connected to UI 300 by way of bus 318, as in FIG. 3. Other SAN configurations are designated 401, 402, 403, 404, and 405. Each SAN is connected to UI 300 directly by way of busses 406, 407, 408, 409 and 410 respectively, each such bus being connected to its respective portal processor (not shown) located within its SAN. As noted before, only the bus being used as a communicative link to the UI from and to each SAN and not every bus connection between the UI and multiple storage processors within each SAN is shown, for purposes of enhancing clarity of presentation. Multiple SANs (not limited to the number shown herein) can thus be managed by a single UI in accordance with principles of the present invention because the UI has been relieved of an unduly burdensome processing load as a result of each portal processor forwarding its combined SAN object tree view to the UI rather than requiring the UI to dissipate its processing power by computing each combined SAN object tree view.

Figure 5:
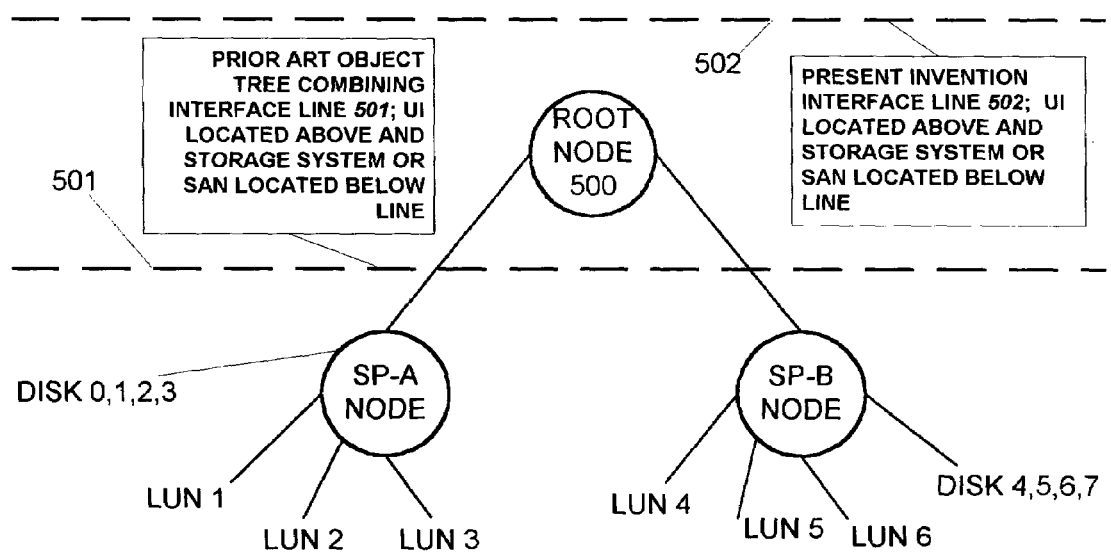
FIG. 5 is a schematic diagram of object tree information of various types including the type that may be learned, stored, combined and utilized by the user interface in a computer network utilizing principles of the present invention.

FIG. 5—Object Trees

FIG. 5 is an object tree schematic diagram of information of various types including that which may be learned, stored, and combined in storage processors and utilized by the user interface. Referring first to object or node labeled SP-A, it is shown as having several "child" nodes, namely: LUN 1, LUN 2, and LUN 3 as well as a node labeled Disk 0,1,2,3. A node in addition to being used herein interchangeably with object is also a logical/functional construct enabling one to envision and design interrelationships in a computer system or computer storage system. Under certain circumstances, a node could represent a complete functional entity and in another instance could represent a sub-function within such entity. LUN means "logical unit" which is a logical construct that exists in or on storage systems, which is accessible by a server to store data and which can look like a disk drive to the server. There is a parent-child hierarchical relationship between node SP-A and its child nodes. Node SP-A is intended to represent object information describing SP-304 of FIG. 3. Similarly, SP-B is also shown as having several child nodes, namely: LUN 4, LUN-5, and LUN-6 as well as a node labeled Disk 4,5,6,7. There is also a parent-child hierarchical relationship between node SP-B and its child nodes. Node SP-B is intended to represent object information describing SP-305 of FIG. 3. In FIG. 3, each SP is shown connected to three servers and four disks and such a configuration would ordinarily be represented in a more complex object tree by more than only three LUNs per SP; thus, it should be understood that more LUNs are implied in FIG. 5 but only three LUNs per SP are shown for purposes of enhancing clarity of presentation.

When SP-304 functions to build its object tree representing itself and its directly connected nodes it constructs relationships that can be generally represented pictorially as shown as the parent-child relationships for SP-A (although realistically in a much more complex pattern than that shown). Similarly, when SP-305 functions to build its object tree representing itself and its directly connected nodes it constructs relationships that can be generally represented pictorially as shown as the parent-child relationships for SP-B, (again, more complex than shown). Accordingly, at this stage of the object tree construction within a storage system such as storage system 303, neither processor has an object tree representation of either the complete configuration of the storage system or the complete SAN. It should also be understood that more than two processors per storage system can be used. If there were three processors, then there would be three object trees constructed, etc. Accordingly, to obtain a complete object tree representation of SAN 319 all constructed object trees must be combined (whether, two, three or whatever number of storage processor trees constructed).

After such combination a new node is created, namely, "root" node or object 500 which is now the "parent" of two child nodes SP-A and SP-B, and which contains at least general header-type information about its storage processor children. Essentially what is in root node 500 is either all of the information below it in the tree, or header information suggesting all of the information below it in the tree. Accordingly, the root node or object is the best starting point for the inquiry, but, as noted, having only the root alone may not be sufficient. However, not only can you eventually get all of the objects in the storage system or the SAN via the root node, but you also get them in proper association with each other, which is of prime importance.

All of these many different objects in this kind of a system include an object that describes a storage system. However, as noted, a storage system has components in it such as LUNs, Disks and storage processors which are each also expressed as an object. Thus, the manner in which to express the notion that a storage system object contains disk objects, via object-oriented design (OOD) methodology is accomplished with the "HAS A" relationship, a familiar term in such OOD. And, this relationship is expressable in an object tree where, as in this example, root object 500 "HAS A" SP object for SPA and "HAS A " SP object for SP-B. Similarly, SP-B "HAS A" disk object(s), LUN object(s), etc. And, all of these objects are required for the computer system to really extract all the information needed about the storage system or SAN. For example, if a user needed capacity information about the disks, the user would (via the combined object tree) ask the storage system about the disk object, and then (via the combined object tree) ask the disk object to get the capacity.

Referring next to interface dashed lines 501 and 502, they are used to represent locations within the network where such object tree combining can take place. In the prior art such object tree combining took place in the UI. Prior art object tree construction interface line 501 shows root object 500 located on the UI side of that interface meaning that root 500 was constructed and all object trees were combined in the UI. Accordingly, resources of the UI had to be dedicated to that activity. However, referring to present invention object tree construction interface line 502, root node 500 falls on the storage side of that interface meaning that root node 500 was constructed and all object trees were combined in storage processors, thus alleviating that burden from the UI. Then, UI 300 can request root node 500 from any particular storage processor on which it resides, and thus make such particular processor the portal processor. (Also, UI can select a different portal processor later if the first selected portal processor malfunctions or is otherwise no longer desirable to use.) By returning such root node to the UI, the portal processor allows the UI to have access to header information about the complete object tree representing the complete storage system or SAN. Armed with such header information, the UI can then call for any or all of the complete object tree and store it in its local database for convenient access of its users.

Figure 6:
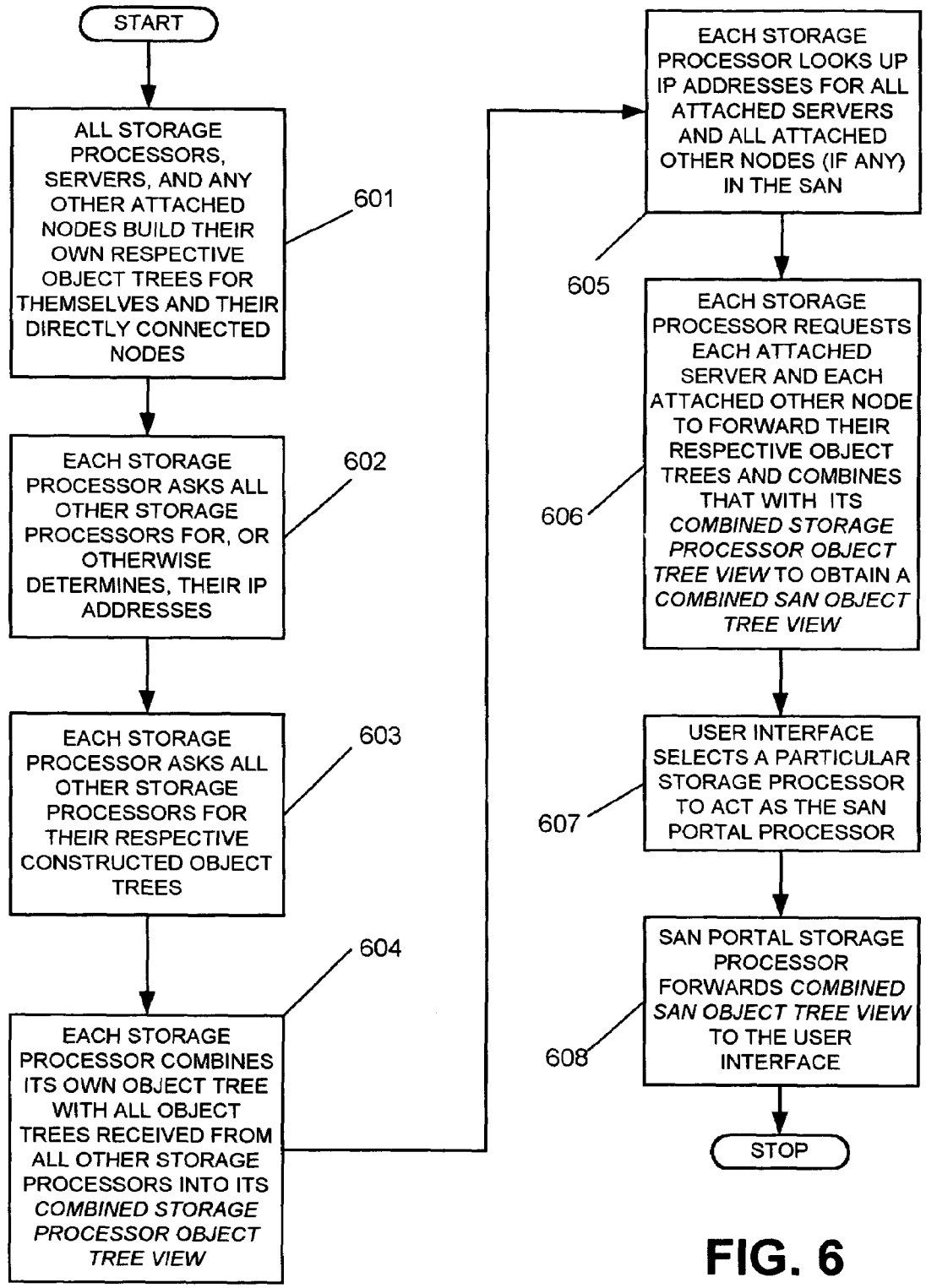
FIG. 6 is a flowchart illustrating a startup algorithm in accordance with principles of the present invention; and, FIG. 7 is another flowchart illustrating the algorithm associated with commands issued by the user interface in accordance with principles of the present invention.

FIG. 6—Flowchart of Startup Algorithm

FIG. 6 is a flowchart illustrating a startup algorithm in accordance with principles of the present invention. It is discussed in terms of a SAN, but it is understood that the present invention also encompasses a storage system by itself as well as part of a SAN. The algorithm is thus equally applicable to a storage system as well as the SAN of which it is a part. In block 601 all storage processors, disk drives, servers, and any other attached nodes in the SAN build their own respective object trees for themselves and for their child nodes. Upon completion the algorithmic process moves to block 602 where each storage processor determines the respective internet protocol (IP) addresses for all other storage processors (its peers) over LAN busses interconnecting them. When completed the algorithmic process moves to block 603 where each storage processor asks (via the LAN busses and/or IP addresses) each other storage processor in the storage system for its constructed object tree. Next, in block 604 each storage processor combines its own object tree with all object trees received from all other storage processors into its combined storage processor object tree view. At this juncture, each storage processor holds the same object information as the next processor although the "view" from each processor might be different. Next, referring to block 605 each storage processor obtains IP addresses for all attached servers, disk drives and any other attached nodes in the SAN. Next, referring to block 606, each storage processor requests that all such attached servers, disk drives and nodes forward their respective object trees, and then combines them with the combined storage processor object tree view to obtain a combined SAN object tree view. Next, referring to block 607, the UI selects a particular storage processor to act as the SAN portal processor. Finally, in block 608, in response to a request from the UI, the SAN portal processor forwards the combined SAN object tree view to the user interface.

Figure 7:
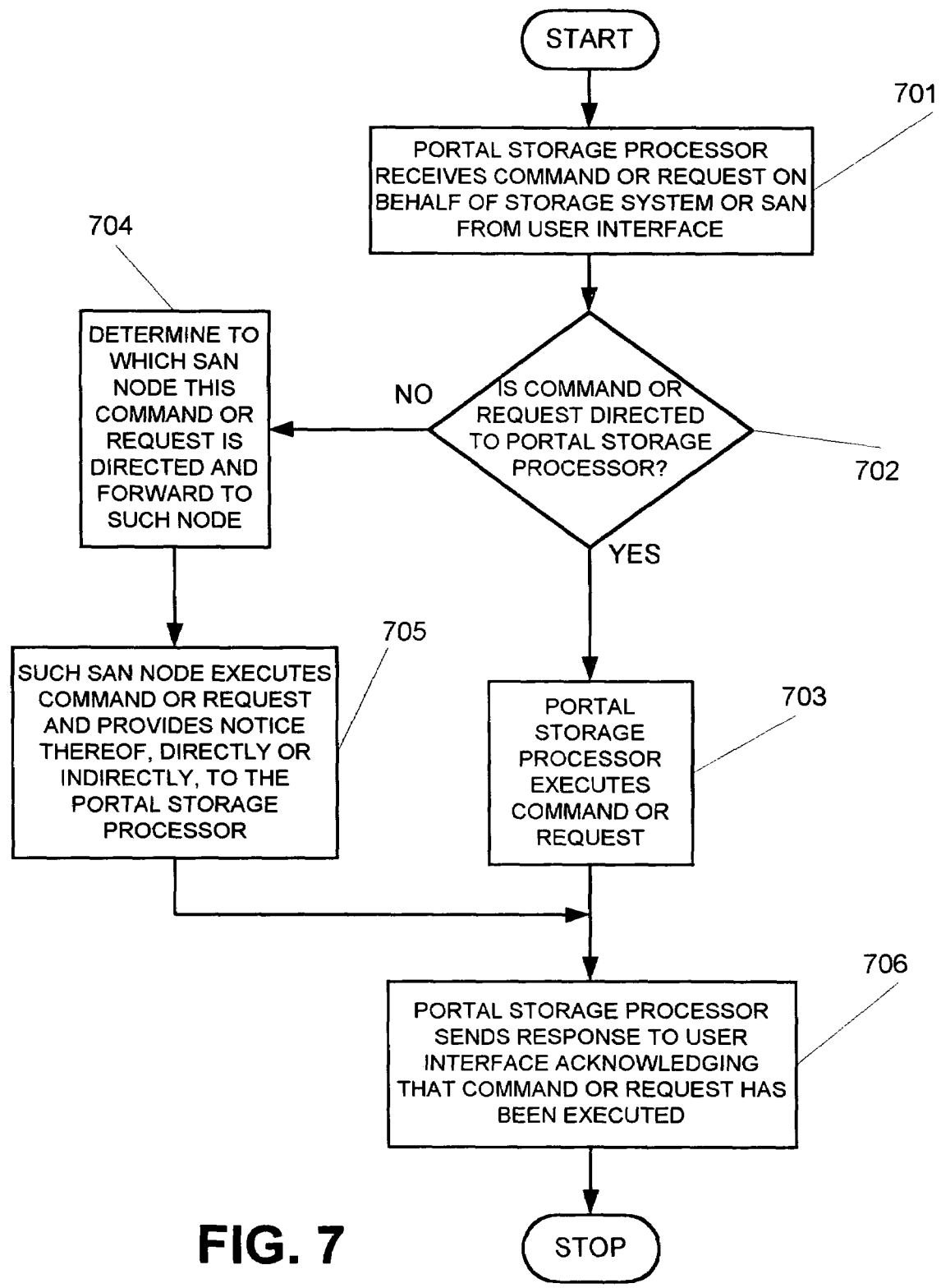

FIG. 7—Flowchart —UI Commands

FIG. 7 is a flowchart showing the algorithm associated with commands issued by the user interface in accordance with principles of the present invention. In block 701, the portal storage processor receives a command or request from the UI, for example, in FIG. 3, SP 304 can receive a command via bus 318 from UI 300. For example, the UI might want to command a storage processor to "clear cache". Or, as another example, the UI may want to command a particular server to choose a different communication channel to storage. The algorithmic process moves next to decision block 702 wherein the query is made: is the command or request directed to the portal storage processor? Thus, in our example, portal storage processor 304 responds "yes" if the command is directed to it, and the algorithmic process moves to block 703 where the portal processor through its agent software executes the request and then sends an acknowledgment back to the user interface, as depicted in block 706. On the other hand, if the command is not directed to SP-304, the algorithmic process moves from block 702 via the "no" output to block 704 where a determination is made regarding which SAN node this command is directed to and then forwards such command to such node. In block 705, the addressed SAN node receiving such command, using its agent software, executes it and provides notice thereof to the portal storage processor. Such notice is provided directly if, for example, the addressed SAN node is a directly-coupled peer processor (as shown in FIG. 3), and indirectly if, for example, it is a server operatively coupled to a peer processor. Finally, the algorithmic process moves to block 706 where the portal storage processor, through its agent software, sends a response to the user interface acknowledging that such command or request has been executed.

The present embodiments are to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. In an object oriented computer network including a user interface and a storage system, said storage system including both a plurality of storage processors each having information defining itself and its relationship to all of its directly coupled nodes and at least one disk drive, apparatus for managing said storage system comprising:

first sub-apparatus for communicating between said user interface and each one of said plurality of storage processors;

said each one of said plurality of storage processors including second sub-apparatus for communicating with both all other of said plurality of storage processors and said at least one disk drive;

said second sub-apparatus including third sub-apparatus for obtaining said information from each of said all other of said plurality of storage processors whereby said each one of said plurality of storage processors contains all said information in said storage system; and, said user interface including selection sub-apparatus for selecting a particular one of said plurality of storage processors, whereby a single management point of ingress to and egress from said storage system is established for said user interface.

2. The apparatus of claim 1 wherein said information is object tree information.

3. The apparatus of claim 2 wherein said storage system is operatively coupled to at least one server, said storage system and said at least one server thereby forming a SAN, and wherein said third sub-apparatus includes fourth sub-apparatus for obtaining said object tree information from said at least one server whereby said each one of said plurality of storage processors contains all said object tree information in said SAN.

4. The apparatus of claim 3 wherein said user interface sends commands destined for nodes in said SAN to said particular one of said plurality of storage processors which includes respond-send apparatus for both responding to any of said commands destined for itself and for sending all other of said commands along SAN routes to other said nodes in said SAN to which said other of said commands were destined by said user interface.

5. The apparatus of claim 2 wherein said user interface includes different selection sub-apparatus for selecting a different one of said plurality of storage processors for various reasons including malfunctioning of said particular one of said plurality of processors.

6. The apparatus of claim 2 further including an Internet web server and wherein said selection sub-apparatus utilizes said Internet web server for addressing said particular one of said storage processors via an IP address over the Internet.

7. The apparatus of claim 1 wherein said storage system is operatively coupled to at least one server, said storage system and said at least one server thereby forming a SAN, and wherein said third sub-apparatus includes fourth sub-apparatus for obtaining said information from said at least one server whereby said each one of said plurality of storage processors contains all said information in said SAN.

8. The apparatus of claim 7 wherein said user interface sends commands destined for nodes in said SAN to said particular one of said plurality of storage processors which includes respond-send apparatus for both responding to any of said commands destined for itself and for sending all other of said commands along SAN routes to other said nodes in said SAN to which said other of said commands were destined by said user interface.

9. The apparatus of claim 1 wherein said user interface includes different selection sub-apparatus for selecting a different one of said plurality of storage processors for various reasons including malfunctioning of said particular one of said plurality of processors.

10. The apparatus of claim 1 further including an Internet web server and wherein said selection sub-apparatus utilizes said Internet web server for addressing said particular one of said storage processors via an IP address over the Internet.

11. In a computer network including a user interface and a storage system having a plurality of storage processors and at least one disk drive, a system for managing said storage system comprising:

a first sub-system for selectively communicating between said user interface and each one of said storage processors;

said each one of said storage processors including a second sub-system for learning and storing information about itself and about all other nodes in said network including all other of said storage processors, about its relationship with said all other nodes, and about inter-relationships between any one of said other nodes and any other of said other nodes to thereby obtain and have available complete network node information; and, said user interface including a third sub-system for requesting said complete network node information from a particular one of said plurality of storage processors and thereby establishing a single management point of ingress to and egress from said storage system through said particular one of said storage processors for said user interface.

12. The system of claim 1 wherein:

said user interface includes a fourth subsystem for forwarding commands to said particular one of said storage processors.

13. The system of claim 12 and wherein said particular one of said storage processors includes;

a fifth sub-system for determining if any of such commands are for itself to obtain particular commands to be processed;

a sixth sub-system for processing said particular commands; and, a seventh sub-system for forwarding said commands other than said particular commands to their respective destinations within the network.

14. The system of claim 11 wherein said information is object tree information.

* * * * *